Dec. 14, 1926.
A. J. BAKER
AUTOMOBILE BODY
Filed Sept. 14, 1923
1,610,728
4 Sheets-Sheet 1
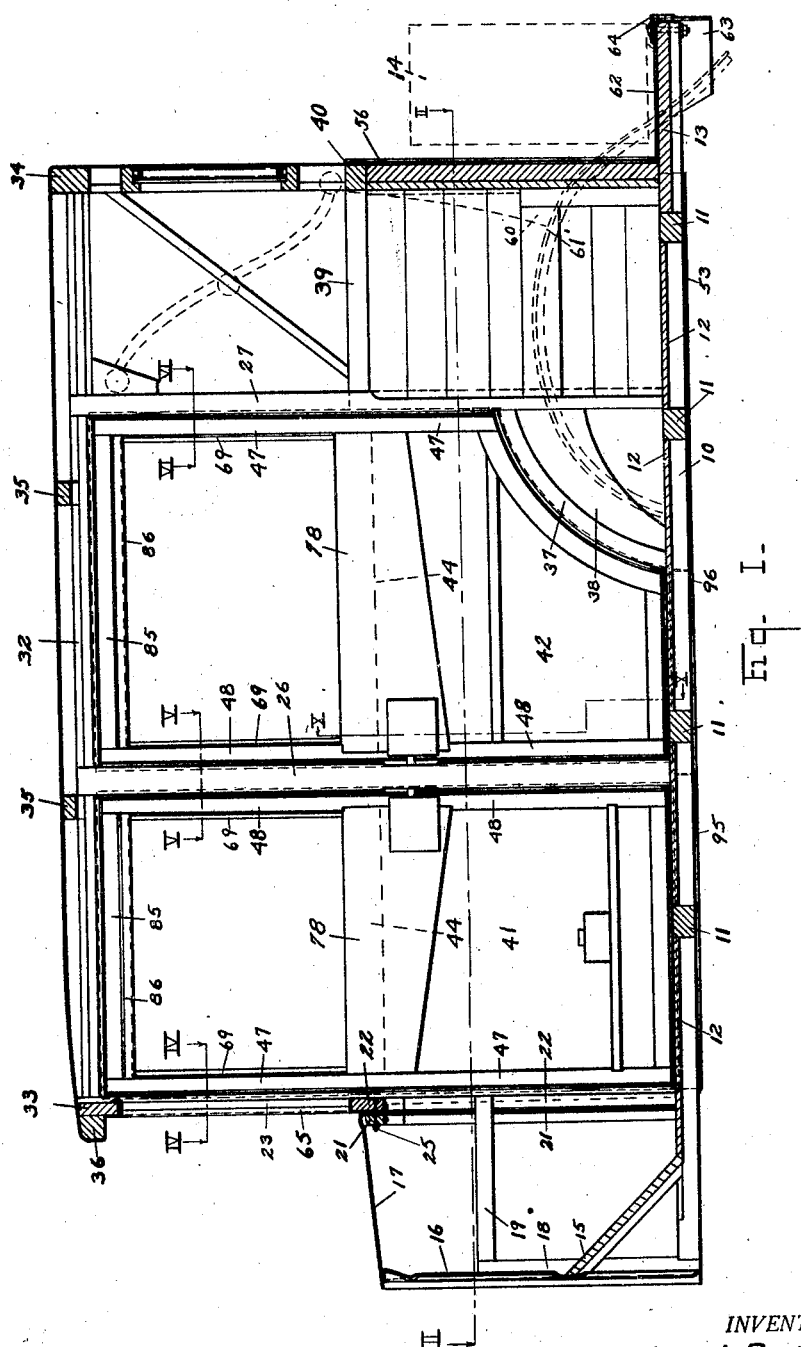
INVENTOR.
Arthur J. Baker.
BY Solon J. Boughton
ATTORNEY

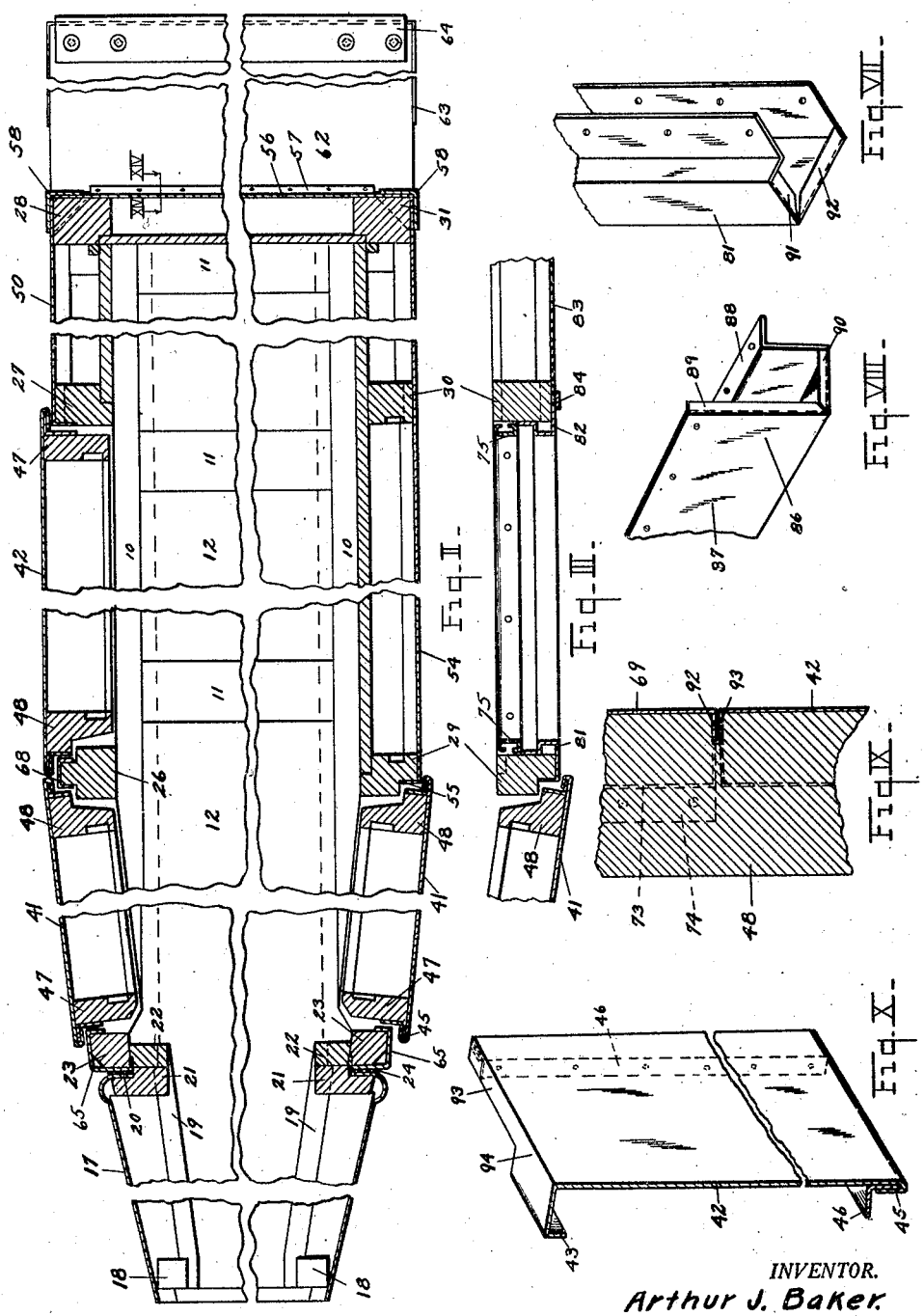

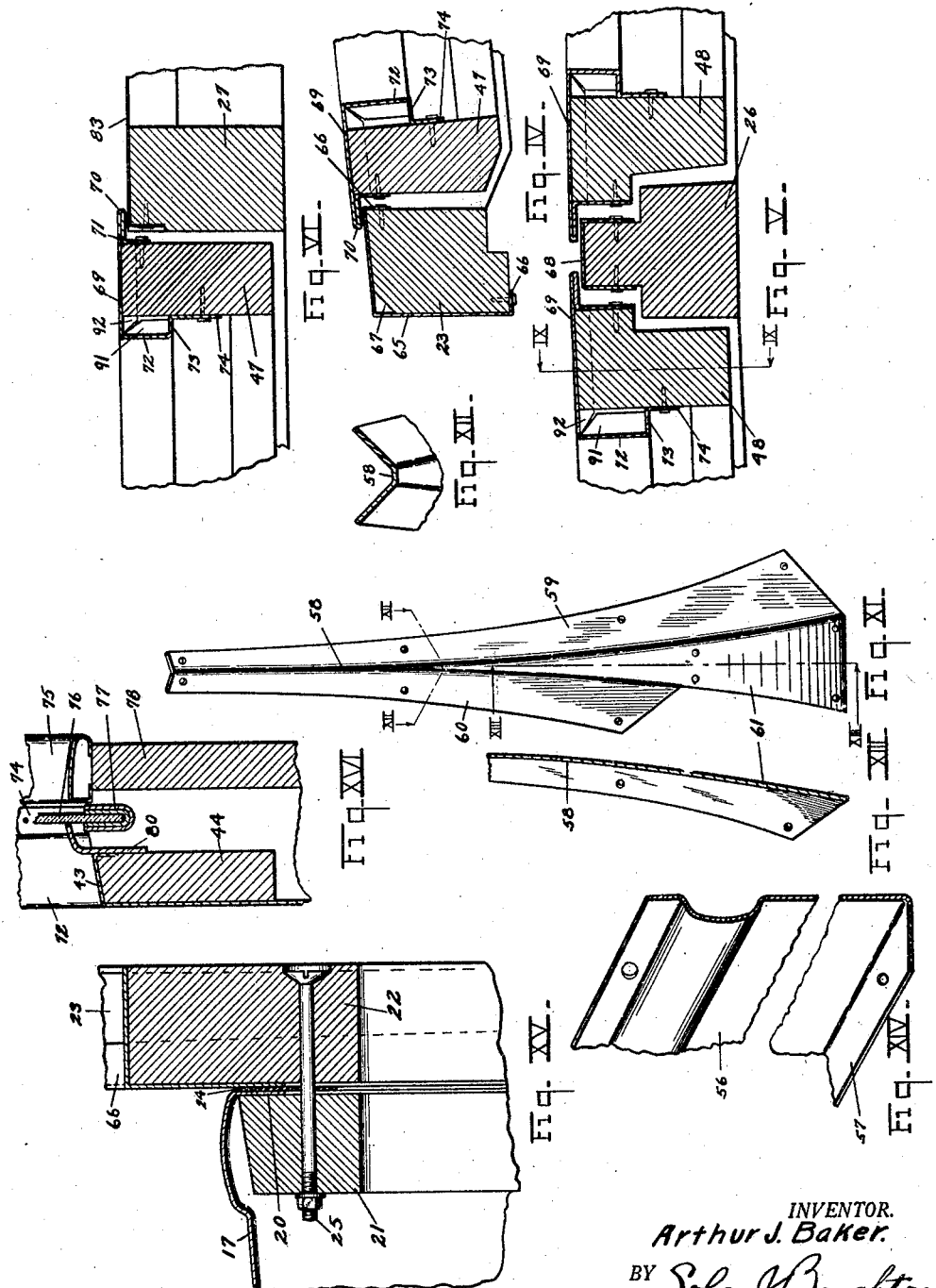

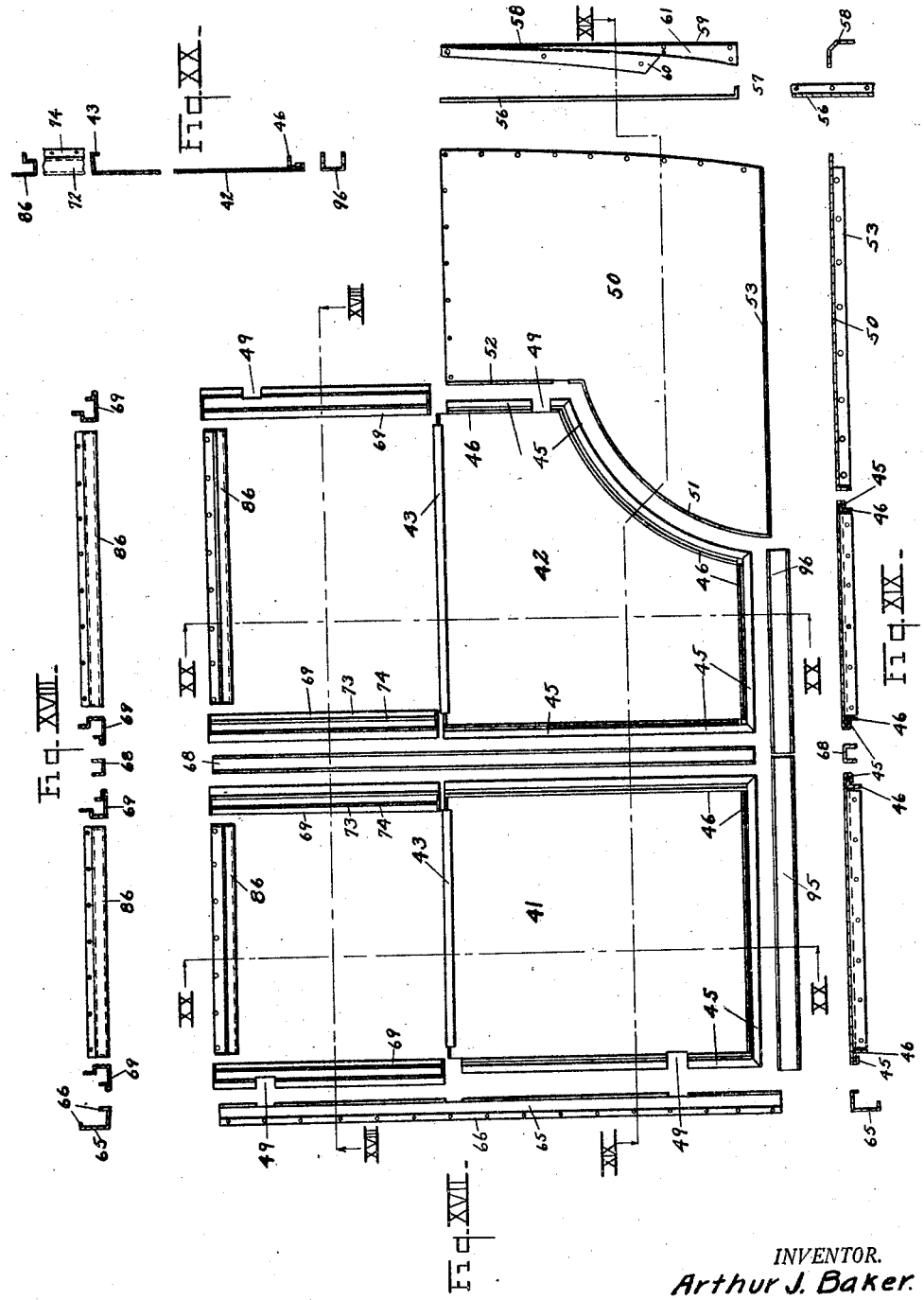

Patented Dec. 14, 1926.

1,610,728

UNITED STATES PATENT OFFICE.

ARTHUR J. BAKER, OF TOLEDO, OHIO, ASSIGNOR TO THE WILLYS-OVERLAND COMPANY, OF TOLEDO, OHIO, A CORPORATION OF OHIO.

AUTOMOBILE BODY.

Application filed September 14, 1923. Serial No. 662,717.

The present invention relates to improvements in automobile bodies, and to the method of constructing the same.

One object of the invention is to provide an improved method by which the cost of producing automobile bodies, particularly of the closed type, can be greatly reduced without detracting from the appearance or durability of the body.

Another object of the invention is to build up a complete body frame structure of wood and to complete the construction of the metal covering therefor before applying the same, to the extent of cutting and pre-forming all of the various sections to the exact sizes and shapes required, and further, coating the sections with enamel or the like and baking the enamel thereon, under a high degree of temperature before assembling and securing the sections upon the frame.

Another object of the invention is to so form, proportion and arrange the various metal sections for covering the wood frame structure, as to reduce to a minimum the time and trouble of applying the sections to the frame, the construction of the parts being such as to make it unnecessary to employ highly skilled labor in the application of the finish to complete the body.

Another object of the invention is to so shape and flange the various sections of the metal finish, as to permit them to be applied and secured to the frame structure as separate units adapted for application each independently of the other, and also arranged to be independently secured, preferably by nailing to the various parts of the frame. This method of construction greatly reduces the cost of repairs, by facilitating the taking off of the particular part or parts which may require removal and replacement from time to time.

Another object of the invention is to provide a strong, durable body, cheaply constructed, and in such a manner as to be practically noiseless in service and capable of withstanding the excessive strains and stresses to which it may be subjected from time to time.

Objects relating to details of construction and economies of manufacture, and other objects, will appear from the description to follow, covering that embodiment of the invention, which, for the purposes of the present application, I have illustrated in the the accompanying drawings, in which:

Figure I is a longitudinal, sectional elevation of a vehicle body frame constructed in accordance with the invention.

Fig. II is a fragmentary, sectional plan of the body, taken on line II—II of Fig. I.

Fig. III is a sectional plan through the stationary window on the left side of the body, as viewed from the rear.

Fig. IV is an enlarged sectional plan taken on line IV—IV of Fig. I.

Fig. V is an enlarged sectional plan taken on line V—V of Fig. I.

Fig. VI is an enlarged sectional plan taken on line VI—VI of Fig. I.

Fig. VII is a fragmentary view in perspective of the door post cover shown at the left of Fig. III.

Fig. VIII is a fragmentary view in perspective of the cover or finishing strip for the top rail of the side doors.

Fig. IX is an enlarged vertical section through one of the door stiles at the joint between the door panel and stile cover, taken on line IX—IX of Fig. V.

Fig. X is an enlarged sectional elevation showing in perspective, one of the side door panels, the section being taken on line X—X of Fig. I, with certain parts omitted.

Fig. XI is a perspective view of a cover plate for the rear corners of the vehicle body.

Fig. XII is a section taken on line XII—XII of Fig. XI.

Fig. XIII is a sectional elevation taken through the lower portion of the cover plate on line XIII—XIII of Fig. XI.

Fig. XIV is an enlarged sectional elevation showing in perspective, the lower panel on the back of the vehicle body, the section being taken on line XIV—XIV of Fig. II.

Fig. XV is an enlarged vertical section showing the application of the cowl cover plate to the front of the body.

Fig. XVI is an enlarged fragmentary sectional elevation taken through the bottom of the window of one of the doors.

Fig. XVII is diagrammatic view showing the several side panels and cover strips for the door stiles, rails, etc., the arrangement being such as to show approximately, the relative positions of the several sections when assembled upon the body.

Fig. XVIII is a sectional plan taken on line XVIII—XVIII of Fig. XVII.

Fig. XIX is a sectional plan taken on line XIX—XIX of Fig. XVII, and

Fig. XX is a sectional elevation taken on lines XX—XX of Fig. XVII.

Heretofore, in the manufacture of enameled bodies for automobiles, it has been customary to follow one of two methods, first, to construct the body entirely of metal and to bake on the enamel at relatively high temperatures, say 450° Fahrenheit, or second, to construct a composite body of wood and metal and to bake on the enamel at a comparatively low temperature. The first method produces excellent results as to body finish, but it is expensive. The second method is objectionable in that the heat which it is possible to apply without damage to the wood frame does not bake the enamel sufficiently to produce a really lasting finish, and in that the heat which is applied, tends to shrink the wood and melt the glue at the joints, thus loosening the joints and weakening the entire structure. In this second process, it is of course necessary to provide a relatively low baking temperature in order to avoid charring or completely destroying the wood encased in or covered by the metal finish. Some manufacturers have even gone to the trouble and expense of previously treating the wood in an attempt to render it resistant to the effects of the heat to which it is subjected.

With the demand for automobiles of the closed body type constantly increasing, it has become more and more desirable to devise new and cheaper methods of manufacture for the bodies, permitting them to be turned out more rapidly, in order to satisfy the demand for low-priced cars of this type. Applicant's method of cutting and forming all of the various sections of the metal finish to the exact sizes and shapes required, with the necessary securing flanges, the baking of the enamel on the sections under a relatively high degree of temperature, and the subsequent application of the sections to the wood frame, as separate parts independently applied and secured, makes it possible to reduce the cost and to increase the rate of production very materially over the methods at present employed. This is true partly because of the fact that a baking oven of a given size, say large enough in cross-section to accommodate only one completed body, will take care of finish enough to cover a considerable number of bodies when the finish can be stacked and run through the oven in separate pieces, as in the present case. Since the ovens are very expensive to heat, a great saving in cost is effected by thus increasing their capacity without increasing their size, to say nothing of the increase in the output of the number of bodies manufactured in a given time. It will be readily seen that the capacity of a given size plant is determined by the capacity of its ovens, in the baking of the enamel on the bodies. The present method permits the capacity of the ovens to be considerably increased without increasing the cost of operation.

The construction of the skeleton-like frame, and that of the various sections of metal finish, together with the manner of applying the sections to the frame, are clearly shown in the drawings.

The frame structure illustrated in Figs. I, II and III is for a closed body having two doors on one side, and one on the opposite side, the number and arrangement of the doors being varied as requirements may demand. The frame may be of the usual or any desired construction comprising, in the present disclosure, the side sills 10 connected by suitable cross-tie members 11 which form supports for the floor boards 12. The sills are extended rearwardly beyond the body to support the platform 13 for carrying the trunk 14, shown by dotted lines in Fig. 1, and also to form a support for the tire carrier (not shown). The toe-board 15, dash plate 16, and front end of the cowl plate 17, are connected with and supported by the corner frame members 18 extending upwardly from the front ends of the side sills 10, and connnected with the longitudinal braces 19. The rear end of the cowl plate 17 is flanged inwardly at 20 and inserted between the frame members 21 and 22 which extend across between the front door posts 23, and downwardly thereon to the floor. A strip of felt or other yieldable material 24 is preferably inserted between the frame members 21 and 22 which are clamped together by the bolts 25, as shown in Fig. XV, this construction affording a water-tight and noiseless joint. To insert or remove the flange 20 from between the members 21 and 22, it is only necessary to loosen the bolts 25 to permit the loosening of the flange holding member 21, the member 22 being rigidly secured to the corner post 23. The front ends of the braces 19 are suitably secured to the upright frame members 18, while the rear ends of the braces are secured to the vertical portions of the frame member 22.

The posts 26, 27 and 28 at one side of the car, and the posts 29, 30 and 31 at the opposite side, together with the front corner posts 23, are connected at the top by suitable side plates 32 which are in turn connected by the front and rear transverse frame members 33 and 34 respectively, and also the intermediate transverse members 35. Secured to the front cross member 33 is an additional member or molding 36, over which the roof cover is extended, and to which it is secured. The cover consists preferably of fabric, but may be of any material suitable for the purpose.

A brace made up of two pieces, 37 and 38, is provided near the bottom of the frame to receive the front curved portion of the rear side panel, which conforms generally to the curve of the fender shown by dotted lines, the fender being preferably attached to the brace and to the side of the body in the rear of the brace. The side and end rails 39 and 40 respectively, are provided at the back of the body to receive the top edges of the side and back metal panels presently to be described, as well as the lower edge of the fabric for covering the upper portion of the body.

The support or wall forming a backing for the fabric, may consist of any suitable means such as thin metal or cardboard sheets (not shown). Likewise, the inner walls or surfaces for supporting the cloth or fabric for the inside finish (not shown), may comprise thin boards or sheets of any suitable material tacked or otherwise secured to the inner walls of the frame.

The metal finish upon which the enamel is baked previous to the application of the finish to the frame, in a body of the present design, comprises generally the hood and cowl sheets, the side door and the rear side panels and end or back panel, the rear corner cover plates, the cover strips for the door and window stiles and rails, the door post covers, the inside finishing strips for the window frames and the skirting for the trunk platform, and such other parts as are necessary to complete the design.

As before stated, the various sections of the finish are cut to exact size and preformed by bending, stamping or otherwise, and punched with the proper number of holes for nailing or securing them in position. They are then coated and the enamel baked on in suitable ovens at the desired temperatures before the finish is applied to the frame.

The particular shapes and sizes of the various sheets or sections is a matter of design, depending upon the type of body to be built, the object being preferably to construct the finish so that each part can be conveniently applied and secured to the frame independently of the other parts, and with a minimum amount of trouble and time consumed in its application, thus permitting the work to be done more accurately and by labor other than that of the highly skilled class.

In the present design, the front door panels 41 and the rear door panel 42 are each provided with a top flange 43 bent and hooked over the top edges of the intermediate door rails 44, as shown in Fig XVI. The side and bottom edges of these panels are preferably bent as indicated at 45, to form grooves for the reception of the adjustable angle irons 46, whereby any variation in the sizes of the door frames may be taken care of. It is preferred to employ a construction of this kind, but the same is not necessarily essential, as the angles may be omitted and the panels provided with substantially right angle securing flanges, if desired. In the application of the panels to the door frames, the flanges 43 are first hooked over the intermediate rails 44 and the angle irons 46 are then adjusted to properly engage the door stiles 47 and 48, on the hinged and locking edges of the doors respectively, the bottom angle 46 being adjusted to engage the bottom rail of the door, after which all of the angles may be secured by driving nails or screws through holes previously punched in the angles. If desired, the adjustable angle irons may be used only at the bottom and one side of the panel, or only where necessary to take care of the variation between the sizes of the frames and panels. In such cases, the remaining edges of the panels, except at the top, can be provided with plain right angle bent portions adapted for nailing to the door frame. The flanges 45 of the panels are cut out at the desired points for the hinges, as indicated at 49 in Fig. XVII.

Preferably, the angles are positioned within the grooves of the panels before the enamel is applied or baked on.

The rear panel 50 on the side of the body having two doors, is provided with the curved and straight flanges 51 and 52 which are connected respectively to the curved brace member 37 and door post 27. The bottom flange 53 of the panel 50 is extended under the side sill 10 as shown in Fig. I, and connected to the sill. The top edge of the panel is nailed to the rear side rail 39, while the back edge of the panel is nailed to the corner post 28. The panel 54 on the opposite side of the body is similar in construction to the panel 50, except that it extends all the way up to the door post 29, and is provided with a straight edge and flanged inwardly at 55 and nailed to the post within the recessed portion thereof. The bottom flange of the panel 54 extends under and is nailed to the side sill 10, as in the case of the flange 53 of the panel 50. The top edge of the panel 54 is secured to one or more side rail members (not shown), which are disposed between the posts 29, 30 and 31, the latter being the corner post to which the rear edge of the panel 54 is nailed.

The top edge of the back panel 56 is nailed to the cross member 40, Fig. I, while the ends of the panel are nailed to the corner posts 28 and 31. If desired, the upper portion of the panel may be beaded as shown in Fig. XIV. The bottom edge of the panel 56 is provided with an outwardly turned flange 57 which is nailed to the platform 13 which supports the trunk 14. The joints between the ends of the back panel and the rear edges of the side panels 50 and 54, are protected by the corner cover plates 58 shown in Figs. XI, XII and XIII. The flange 59 of the cover plate engages the back panel 56, while the shorter flanges 60 engage the side panels 50 and 54. The short flange 60 is cut away along the top of the fender as shown by dotted line 61' in Fig. I, the fender being secured to the side of the body, as previously stated. In order to relieve to a certain extent, the severeness of the box-like or straight line effect at the rear corners of the body, the lower portion of the corner cover plate 58 is provided with an intermediate triangular portion 61 which gradually tapers toward the top of the cover plate. This triangular portion of the plate is inclined or curved inwardly as shown in Fig. XIII. The corner posts are correspondingly cut away to receive the inwardly curved triangular portion 61, whereby the straight line or box-like effect at the rear corners of the body is relieved and a more pleasing appearance afforded at these points. The cover plates are provided with a suitable number of holes through which nails or screws are driven to secure them in position upon the body.

The trunk platform 13 is provided with a cover plate 62 and at its edges is a downwardly extending plate 63 forming a skirt for the platform. An angle iron 64 is bolted to the rear edge of the platform 13 to brace and strengthen the same and to form a support for the tire carrier brackets (not shown).

The cover plates 65 for the side door posts 23 are shown on an enlarged scale in Fig. IV, and are provided with short inturned flanges 66 which are nailed to the post as indicated. By beveling the outer corner of the post 23 as shown at 67, any trouble that might be caused by the front or outside faces of the post being slightly greater in width than the width of the metal surfaces covering the same, is avoided. The cover 65 extends the full length of the door post 23 between the roof and floor of the body. The intermediate door post 26 is of a cross-section, as indicated in Fig. V, and is provided with a channel-shaped cover plate 68 for the outer exposed portion thereof, the sides of the channel being nailed to the post as shown. The cover 68 also extends the full length of the post between the roof and the floor of the body.

The upper portions of the door stiles 47 and 48 are each provided with a cover or finishing strip 69 as shown on an enlarged scale in Figs. IV, V and VI. These cover strips are similarly constructed, except for being made rights and lefts. In each case, the cover strip 69 is bent back upon itself as shown at 70, and is then bent outwardly at a right angle to form the securing flange 71. On the inside of the window frame, the strip 69 is provided with a right angle bent portion 72, spaced from the door or window stile as shown, the portion 72 having an inwardly bent portion 73 extending parallel with the outer face of the strip. The portion 73 is bent outwardly at a right angle to form the securing flange 74 which is parallel with the securing flange 71, these flanges being nailed to the door stiles as shown. The portion 73 of the strip and the molding 75 extending around the inside of the window frame, form guides for a channel strip (not shown), in which the glass 76 is adapted to slide, the bottom of the glass being provided with a U-shaped metal piece 77, Fig. XVI, adapted to be engaged by the window lifting mechanism (not shown).

The bottom section of the window molding 75 is adapted to rest upon and be secured to the top edge of the door lock board 78, while the side molding strips are secured to the door stiles 47 and 48. A weather strip 80 is secured to the inner face of the bottom window rail 44, and extends upwardly in front of the glass for a short distance as shown in Fig. XVI.

The vertical cover or finishing strips for the sides of the stationary window on the side of the body having only one door, are shown at 81 and 82, Fig. III, and are inserted upon and secured to the side posts 29 and 30 respectively, by nails driven through the flanges of the strips. The joint between the finishing strip 82 and the fabric 83 is covered by a narrow strip 84 of suitable material, positioned as shown in Fig. III, and suitably nailed to the post 30. The upper edge of the side panel 54, for the distance between the posts 29 and 30, is flanged and hooked over a frame member (not shown), in a similar manner to the flange 43 in Fig. XVI. The top rail of the stationary window is covered by a finishing strip similar to that shown in Figs. VIII and XX, said strip extending between the upper ends of the vertical finishing strips 81 and 82.

The top rail 85 for each of the side doors is provided with a finishing strip 86 shaped as indicated in Figs. VIII and XX, said strips beng extended between the upper ends of the door stile cover strips as shown in Fig. I. The finishing strip 86 is secured to the door rail by nails driven through the top edge of the vertical portion 87 thereof, and through the horizontal flange 88.

In order to afford a satisfactory joint between the ends of the top rail cover strip 86 and the door stile cover strips 69, said ends are provided with vertical and horizontal inturned flanges 89 and 90, as shown in Fig. VIII, these flanges abutting the inner face portion 72 of the door stile covers 69, when assembled as shown in Fig. I. Likewise, the bottom ends of the door stile cover strips 69, 81 and 82, are provided with inturned flanges 91 and 92, as shown in Figs. III, IV, V, VI and VII, said flanges being adapted to rest upon the flanged portions 93 and 94 respectively, of the side panels 41 and 42, said portions 93 and 94 being clearly shown in Fig. X. At the point where the flanges 92 and 93 of the cover strip and side panel meet, the door stile or post, as the case may be, is provided with a saw-cut in its outer face to receive said flanges 92 and 93, as shown in Fig IX, this arrangement affording a neat joint between the finishing strips and side panels.

The side sills 10 at the points beneath the side doors, are covered by the channel strips 95 and 96, shown in Figs. XVII and XX.

The fabric 83 for covering the upper and rear portion of the body, extends from the side post 27 around the back of the body to the side post 30, and may be secured by gluing and nailing, or otherwise as desired.

The assembling and nailing of the various enameled sections described above, is a relatively simple matter, since there is no cutting or fitting of the parts or interconnecting of one with another. As previously stated, the baking on of the enamel before applying the parts to the frame, and the easy application of the finish after the parts have been enameled, together with the considerable saving in the cost of enameling by being able to increase the capacity of the ovens without increasing their size, and the consequent increase in the output of the bodies, constitutes a marked advance in the manufacture of automobile bodies of the type described above.

While I have shown in considerable detail, a specific embodiment of my invention, it is to be understood that this showing and description are illustrative only, and that I do not regard the invention as limited to the details of construction illustrated or described, except in so far as I have included such limitations within the terms of the following claims, in which it is my intention to claim all novelty inherent in my invention broadly as well as specifically.

I claim as my invention:

1. An exterior metal finishing strip for non-metallic automobile door or window posts or stiles, comprising two parallel securing flanges adapted for sliding into engagement with the opposite sides of the stile, and simultaneously contacting therewith, each of said flanges having outwardly bent portions connected by two intermediate portions at a right angle to each other, one of said outwardly bent portions forming a cover for a joint between the stile and an adjacent portion of the automobile body, and the other outwardly bent portion forming a rest for a window element.

2. An exterior metal finishing strip for non-metallic automobile door or window posts or stiles, comprising two securing flanges extending in the same direction, and adapted to closely contact with the sides of the stiles, and having outwardly extending portions, one of which is bent back upon itself and connected to the other by a right angle portion extending substantially parallel to said flanges, said flanges being adapted for slipping into engagement with opposite sides of said styles.

3. In automobile body construction, a non-metallic post and a non-metallic door stile having a rabbeted joint formed between them and an exterior finishing strip for the door stile comprising a pressed metal section having two parallel flanges engaging opposite sides of the door stile, one of which is bent outwardly and back upon itself and adapted to overlie the door post, and the other bent outwardly and thence transversely in spaced relation to the door stile and connected with said bent back portion, and means adapted to secure said flanges to the sides of the door stile.

4. A joint covering strip for corners of automobile bodies, comprising a pressed plate having three angularly disposed sides, the intermediate one of which is triangular in shape.

5. A joint covering strip for corners of automobile bodies, comprising a stamped plate having two angularly disposed sides, and an intermediate angularly disposed side, the latter being inclined relative to the first-named sides.

6. A joint covering strip for corners of automobile bodies, comprising a stamped plate having two angularly disposed sides, and an intermediate angularly disposed side, the latter being triangular in shape and inclined relative to the first mentioned sides and adapted to conform to the contour of a similarly inclined surface of the vehicle body.

In testimony whereof, I affix my signature.

ARTHUR J. BAKER.